PROUTY & WHITMAN.
Corn Sheller.

No. 6,421. Patented May 29, 1849.

UNITED STATES PATENT OFFICE.

DAVID O. PROUTY, OF PHILADELPHIA, PENNSYLVANIA, AND EZRA WHITMAN, OF BALTIMORE, MARYLAND.

CORN-SHELLER.

Specification of Letters Patent No. 6,421, dated May 29, 1849.

*To all whom it may concern:*

Be it known that we, DAVID O. PROUTY, of the city of Philadelphia, in the State of Pennsylvania, and EZRA WHITMAN, of the city of Baltimore, in the State of Maryland, have invented certain new and useful Improvements in the Manner of Constructing a Machine for Shelling Corn; and we do hereby declare that the following is a full and exact description thereof.

In our machine the shelling of the corn from the ear is effected in the same manner as by various machines used at present for the same purpose; the ears of corn to be shelled, being fed in through a feed box, in such a manner as to pass between and in contact with, the stripping teeth set upon the sides of the driving wheel, and the beveled surface of a wheel revolving under the lower end of the feed box, which beveled surface is supplied with a kind of teeth, or cogs, for the purpose of taking hold of and carrying through the machine the ears of corn received through the feed box,—the upper side of the feed box being movable, and supplied with a spring, which operates in such a manner as to press the ears of corn as they pass through the machine, firmly between the stripping teeth, set on the driving, and those upon the surface of the beveled, wheels.

The first of our improvements upon the above described machine consists, in cutting out or beveling that portion of space on each side of the driving wheel and pinion, between the teeth on the pinion attached to the beveled wheels and those on the driving wheel operating the pinion, in such a manner as to present a sharp edge between the teeth of the pinion, and driving wheel, instead of a square bed or plane surface. The advantage of this improvement consists in this—that the grains of corn which are unavoidably thrown by the process of shelling between the teeth of the pinion and driving wheel, are allowed to pass through without being caught between the ends of the teeth of the pinion or driving wheel, and the surface between the teeth of the driving wheel on pinion opposite; or if caught between the teeth and the opposing edge made between the teeth as above described, are divided or split by the edge and fall out, without being crushed and sticking in a bruised mass, in such a manner as to require an increase of power to work the machine, or impairing its operation by forcing the driving wheel and the pinion from their proper places, or breaking the machine as is frequently the case in machines made without this improvement.

Figure 1:
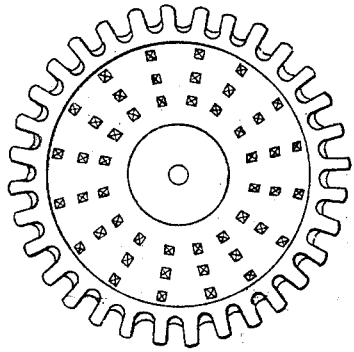
Figure 2:
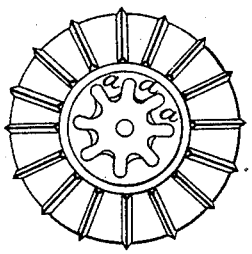
Figure 6:
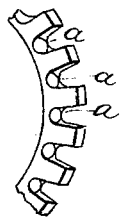

In the annexed drawing, which is to be taken as a part of this specification, Figure 1, is a side view of the driving wheel, Fig. 2, a side view of the pinion as attached to the shaft of, and in connection with, the beveled wheels, and Fig. 6, a perspective view of a segment of either driving wheel, or pinion, in which is represented at the points *a, a, a,* in each figure, the manner of cutting out or beveling the spaces between the driving wheel teeth and those of the pinion so as to form an edge in the place of the square bed or plane surface which would otherwise occupy the space between the teeth.

Figure 3:
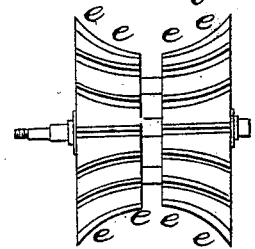

The second improvement which we claim to have made in the above machine consists in making the bevel, on the beveled wheels, concave in such a manner that the concave surface so made shall partially inclose or come in contact with a much larger portion of the ears of corn as they pass through the machine, than would be, with the ordinary straight bevel now in use, and so that the outside circumference of the concave may operate as a kind of flange which from its shape will keep the ears of corn more firmly in contact with the stripping teeth on the sides of the driving wheel, thereby making the machine more effective in cleaning or shelling all the corn from the ear. Fig. 3, in the annexed drawing is a view of the beveled wheels with the bevel between the points *e, e,* made concave.

Figure 4:
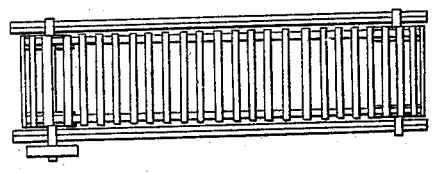
Figure 5:
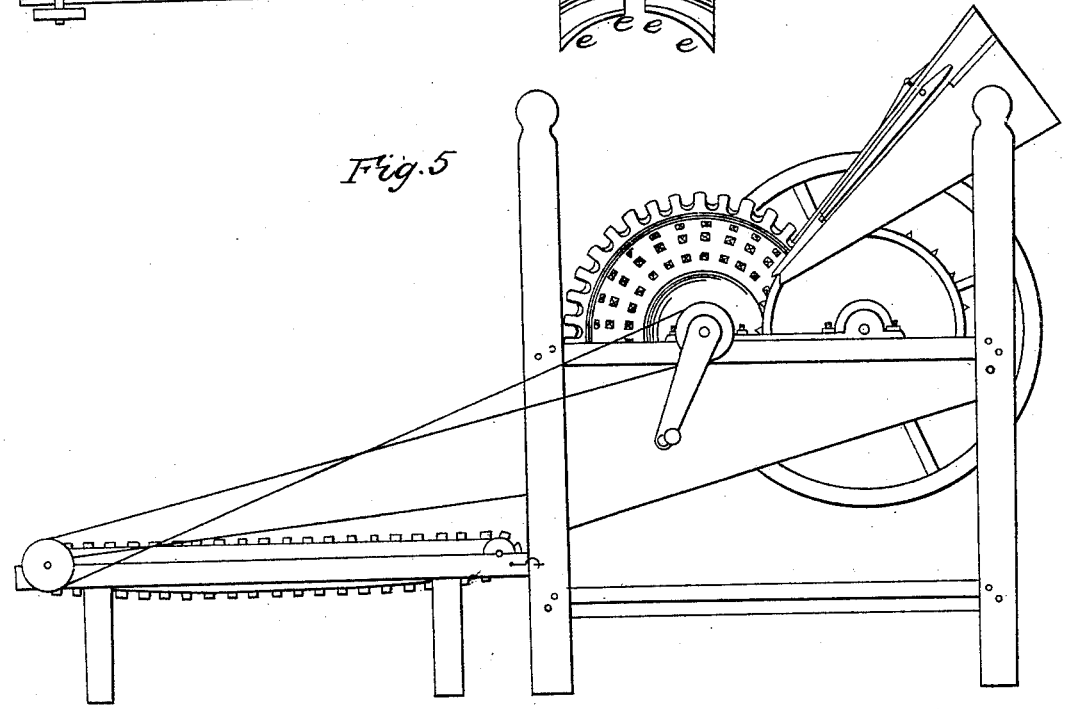

The third improvement which we claim to have made on the aforesaid machine consists in the combination with, and attachment thereto, of a separator made of an endless belt of slats, operated by a band passing over a pulley attached or fastened upon the shaft of the driving wheel of the shelling machine thence over a pulley fastened to the end of the shaft of the cylinder operating the endless belt of slats—over which endless belt of slats the cobs are conveyed to a receiver, and through the interstices or spaces between the slats, the corn is allowed to pass, and in that manner separating the corn from the cob, as they leave the machine. Fig. 4, in the annexed drawing, is a top view of the endless belt of slats, with the cover and side boards taken off, and Fig. 5 a side view of the shelling machine, as attached to the separator, and as operated by the band passing from the pulley upon the driving wheel shaft of the one, to that upon the shaft of the operating cylinder of the other.

Having thus fully shown and specifically described the nature and kind of our several improvements in the construction of the machine for shelling corn, and fully and specifically described the several operations of the said several improvements, now

What we claim therein as new and desire to secure by Letters Patent, are—

1. The manner in which we cut out, and bevel off the spaces between the teeth of the driving wheel and pinion, as represented in Figs. 1, 2, and 6, at the points $a, a, a$, so as to present a sharp edge, instead of a plane surface on bed between the teeth.

2. We claim the combination of the toothed wheel seen in Fig. 1 with the beveled, or curved cylinder seen in Fig. 3, arranged in the manner and for the purpose described, which said improvements being so made, are to operate in the manner, and for the purposes hereinbefore more fully and specifically set forth. We do not claim any other part of the within described machine or apparatus as our invention.

DAVID O. PROUTY.
EZRA WHITMAN.

Witnesses to signature of Ezra Whitman:
H. R. ROBBINS,
SILAS M. COCHRAN.

Witnesses to signature of David O. Prouty:
GEO. W. BANKS,
CHARLES HEITE.